United States Patent Office 2,813,039
Patented Nov. 12, 1957

2,813,039

LEAD CHROMATE PIGMENT COMPOSITIONS

John E. Bishop, Westfield, N. J., assignor to E. I. du Pont de Nemours and Company, Wilmington, Del., a corporation of Delaware No Drawing. Application August 26, 1954,
Serial No. 452,453

9 Claims. (Cl. 106—298)

This invention relates to the manufacture of a new lead chromate pigment composition. More particularly, it relates to a new Molybdate Orange pigment composition.

"Molybdate Orange," as used in this specification, refers to a composition comprising mixed crystals of lead chromate, lead sulfate, and lead molybdate, as described in U. S. Patent 1,926,447 and by Linz, Industrial and Engineering Chemistry 31, 298 (1939).

One of the substantial uses of lead chromate pigments is the use in aqueous systems where their complete insolubility in water and their generally hydrophilic nature are favorable to such use.

At some point during the manufacture of these pigments, they are obtained in the form of aqueous pastes. It has been proposed to eliminate additional processing such as drying, pulverizing, etc., and sell the pigments in paste form. However, the pastes provide several disadvantages. They tend to dry out when the container is opened, with the formation of difficultly-dispersible grit or lumps. Transportation of pastes, because of the additional weight of water and the necessity of using metal containers, is expensive. Storage requires special precautions to prevent freezing of the aqueous pastes during cold weather. Furthermore, many lead chromate pigments when stored as aqueous pastes are unstable and the crystals tend to change structure and size, with consequent undesirable changes in hue. In the use of pastes in aqueous coating compositions it is necessary to compensate for the water in the pastes: the loss of water during handling of the pastes makes accurate compensation difficult.

The alternative of drying the paste and pulverzing, although adding manufacturing steps, avoids most of the above disadvantages and has been preferred by the industry. However, despite their generally hydrophilic nature, most lead chromate powders require special treatments to make them readily dispersible in water. Without such treatments, the particles may not be completely dispersed and the color values fall below the inherent capacity of the pigments.

Among the dispersing agents proposed for the lead chromate powders are sulfonated organic derivatives. However, these agents contribute a serious foaming problem during agitation and they frequently provide undesirable color effects. The water-soluble phosphates, such as sodium pyrophosphate, are also effective to disperse the pigments. Unfortunately, these polyphosphates cause a serious loss in lightfastness. Molybdate Orange pigments, particularly, when treated with sodium pyrophosphate, are unstable and cannot be stored even as dry powders without loss of color strength and shift of hue.

The objects of this invention are to provide a lead chromate pigment composition in powder form that is easily dispersed in water; that does not foam upon dispersing and agitation; that is stable during storage; and, when applied to a surface, whose color and lightfastness suffers a minimum of degradation.

The objects are accomplished by incorporating a small amount of sodium citrate into the lead chromate pigment during manufacture of the pigment and prior to final drying. Along with the sodium citrate it is preferred to incorporate about 20% of a water-dispersible clay.

In a preferred embodiment of this invention, a Molybdate Orange pigment is prepared in any convenient manner known to those skilled in the art and isolated in the form of an aqueous paste. About 0.5% sodium citrate ($Na_3C_6H_5O_7.2H_2O$), based on the dry pigment in the paste, is incorporated into the paste and the combination is thoroughly mixed. Along with the sodium citrate, up to about 20% of a water-dispersible clay, such as china clay (largely a hydrous aluminum silicate), may be incorporated into the mixture. The resulting paste is then dried and pulverized to provide a powder that is readily redispersible in water.

The invention is illustrated in greater detail by the following examples:

EXAMPLE I

This example illustrates the preparation and properties of a Molybdate Orange pigment of the prior art.

347 parts of lead nitrate (1.05 mols $Pb(NO_3)_2$) is dissolved in water and diluted to a volume equal to 10,000 parts of water. In a separate container 115 parts of sodium dichromate ($Na_2Cr_2O_7.2H_2O$—0.77 mol $CrO_3$), 17 parts sodium sulfate (0.12 mol—$Na_2SO_4$), 28 parts sodium molybdate (0.11 mol—$Na_2MoO_4.2H_2O$), and 32 parts caustic soda (0.8 mol NaOH) are dissolved in water and adjusted to a volume of about 10,000 parts. With both solutions at about 20° C., the chromate solution is run into the thoroughly agitated lead nitrate solution.

After a brief stirring period, the pH is adjusted to about 2.5–3.0 by adding a dilute solution of nitric acid. On stirring for about 30 minutes, the color of the slurry changes from the initial bright yellow to the brilliant orange, characteristic of Molybdate Orange pigments. 23 parts aluminum sulfate ($Al_2(SO_4)_3.18H_2O$) in 200 parts water is then added and the pH adjusted to 6.0–7.0 with a dilute solution of caustic soda. After more stirring, the slurry is filtered and washed free of soluble salts. The resulting paste contains from 40% to 60% solids and may be dried at about 80° C. to give a Molybdate Orange pigment. The pigment composition shows poor dispersion in water and relatively poor color strength in aqueous systems.

EXAMPLE II

This example illustrates the effect of a relatively small amount of sodium citrate.

1000 parts of Molybdate Orange presscake from Example I (about 50% solids–500 parts dry color) is charged into a ribbon mixer designed for mixing aqueous pastes. 2.5 parts of crystalline sodium citrate ($Na_3C_6H_5O_7.2H_2O$) is added and the mixture vigorously stirred for about 30 minutes. During this stirring period, the initially very stiff presscake breaks down to a fluid slurry and dispersion is considered complete when no more lumps remain. The fluid slurry is then dried at about 80° C. The resulting lump is pulverized to give an orange pigment powder which is very easily dispersed in water.

The ease of dispersion can be demonstrated very effectively by comparing the behaviour of the dry pigment from Example I with that from Example II when a small amount of each is added to separate beakers of water. The product of Example I settles rapidly to the bottom of the beaker and leaves the water substantially free of color. In contrast, the product of Example II starts to disperse the instant it is placed in the water. Although some may settle to the bottom, most of the powder colors the water uniformly within a short time.

EXAMPLE III

This example illustrates the additional advantage gained by using a water-dispersible clay.

1000 parts of the Molybdate Orange presscake (500 parts dry pigment) of Example I is dispersed with 2.5 parts of sodium citrate in a suitable mixer as in Example II. Then, 50 parts of china clay is added and agitation continued for another 30 minutes. The resulting thick slurry is then dried in about 1-inch layers at about 80° C. The dry lumps are pulverized to give a brilliant orange pigment which exhibits the same ease of dispersion in water as is shown by the product of Example II.

Since about 10% of an inert extender has been added, it would be expected that it would require 110 parts of this pigment to equal the strength of 100 parts of the pigment of Example II. However, in spite of the presence of the clay, there is substantially no loss in strength. Moreover, the clay offsets the slight darkening of masstone caused by the sodium citrate alone; it tends to compensate for the increased cost resulting from the citrate treatment; and it thickens the paste in the mixer to permit better mixing and to avoid splashing as the drier trays are loaded and transported to the oven.

EXAMPLE IV

A medium-shade chrome yellow is made by reacting sodium chromate with lead nitrate, heating to develop the crystal structure and adding alumina hydrate and/or hydrous $TiO_2$ under conditions set forth in detail in Example 4 of U. S. 2,365,171. The resulting washed presscake prior to drying is treated with 0.5% sodium citrate and 10% china clay (based on the dry pigment treated) under the conditions described in Example III. The resulting chrome yellow powder exhibits a degree of dispersion in water and a superiority of tinctorial properties similar to the products of Examples II and III.

The following table is a concise summary of test results comparing the products of the above examples:

Test A consists merely of adding the powders to separate beakers of water and observing the settling rate of the powdered particles and the color of the resulting suspension. It is described in Example II.

Test B is the casein brush-out test to measure masstone. It may be carried out by dispersing the pigment in a casein solution and spreading the resulting composition on paper for comparison with compositions using other pigments. Furthermore, the full strength colors can be diluted with inert white pigments such as water-dispersible grades of titanium dioxide or water-dispersible clays to determine the tinting strength of the pigments.

According to one procedure, a casein solution is prepared by thoroughly dispersing 1200 parts of lactic casein in 6000 parts of water. Then a solution of 48 parts borax and 72 parts trisodium phosphate in 1200 parts water is added and the mixture is heated to about 60° C. To aid in preserving the casein solution, one may add 3 parts beta-naphthol in 44 parts 28% ammonia, then 60 parts octanol, and stir this mixture while cooling.

20 parts of dry color is dispersed in 20 parts of water and, when the color is thoroughly wet, 20 parts of the above casein solution is added. The composition is thoroughly mixed and then brushed through a 100 mesh wire screen. This mixture is then coated on a suitable paper stock by any convenient method. One method involves a so-called "equalizer rod" which comprises a round metal rod of about ¼" diameter, around which is wound a close spiral of fine wire. A small pool of the color mixture is placed on the paper which is held on a flat, slightly resilient surface. The "equalizer rod" is then drawn across the paper to spread the color evenly on the paper. If two colors are to be compared, they may be poured on to the paper side by side and drawn down together by the rod so that it is possible to have the coatings in intimate contact without mixing. This facilitates accurate comparison. Portions of the coated paper can be tested for lightfastness in any well-known manner.

Test C is used to measure the tinting strength of the pigments. One part of color is dispersed in 20 parts of water. Then 20 parts of a paper coating clay and 20 parts of the above casein solution are added. In other respects, this test follows the procedure given for Test B.

The particular method of preparing the lead chromate pigments prior to treatment with sodium citrate is not critical to this invention. These pigments, commonly denominated in the art as "chrome yellows," may vary in hue from lemon yellow to dark orange (the Molybdate Oranges) or a so-called chrome red. The shades may be varied by altering the compositions. Thus, the hues of the Molybdate Oranges can be varied by changing the proportion of chromate, sulfate, and molybdate ions. The shades can also be varied by changing the heating cycles, altering the acidity or alkalinity, and using special treating agents. However, all of the above pigments will display improved dispersion in water if sodium citrate is incorporated into the pigment composition.

The amount of sodium citrate required may vary from about 0.25% to about 3%, based on the dry content of the paste treated and calculated as sodium citrate dihydrate. The optimum amount is about 0.5%. Com- Table

| Examples | Additives | Tests | | |
|---|---|---|---|---|
| | | A—Dispersibility | B—Masstone | C—Tint |
| I | None | Settles | (Control) | (Control.) |
| II | 0.5% Sodium citrate | Disperses | Slightly darkened and slightly dull | 10% stronger. |
| III | 0.5% Sodium citrate and 10% China Clay | do | Very slightly dull | Stronger. |
| IV | do | do | Slightly dull | Do. | mercially available sodium citrate dihydrate was used in the examples. However, any crystalline hydrate or any solution thereof can be used in the process of this invention. For instance, one might use the solution obtained by neutralizing citric acid with sodium hydroxide.

The amount of china clay may vary from its complete absence, as shown in Example II, to amounts even larger than the 10% shown in Example III. It should be pointed out that when using china clay in the absence of sodium citrate, only a diluting effect on color strength is noted. However, by using 0–20% china clay in combination with about 0.5% sodium citrate, there appears to be a synergistic effect so that the resulting product has properties, particularly tinctorial strength, not predictable from the known effect of either agent used above. Above about 20% clay the diluting action predominates and the benefits of the combination seem to disappear.

The lead chromate pigment compositions of this invention are characterized by the exceptional ease of dispersing in water. Thus, they are particularly adapted for use in aqueous systems and are useful for paper coloring, water-emulsion paints, printing inks, etc. The resulting coating compositions are characterized by high tinctorial strength accompanied by excellent lightfastness.

I claim as my invention:

1. A lead chromate pigment of improved water dispersibility containing from 0.25%-3%, based on the dry pigment, of sodium citrate.

2. The composition of claim 1 containing about 0.5% of sodium citrate.

3. A lead chromate pigment of improved water dispersibility containing about 0.25-3% of sodium citrate sufficient to improve the water-dispersibility of said lead chromate pigment and a water-dispersible clay.

4. The composition of claim 3 wherein up to 20% of a water-dispersible clay is used.

5. The composition of claim 3 wherein the water-dispersible clay is china clay.

6. A lead chromate pigment composition of improved water dispersibility containing from 0.25-3% of sodium citrate and up to 20% of china clay.

7. The composition of claim 6 wherein the lead chromate pigment is Molybdate Orange.

8. A lead chromate pigment composition of improved water dispersibility containing about 0.5% of sodium citrate and up to 20% of china clay.

9. The composition of claim 8 wherein the lead chromate pigment is Molybdate Orange.

References Cited in the file of this patent

UNITED STATES PATENTS

| | | |
|---|---|---|
| 2,044,244 | Harshaw | June 16, 1936 |
| 2,260,871 | Sawyer | Oct. 28, 1941 |
| 2,668,122 | Pitrot | Feb. 2, 1954 |

OTHER REFERENCES

"Industrial of Engineering Chemistry," vol. 31 of 1939, pp. 298–306.